Patented July 28, 1953

2,647,081

UNITED STATES PATENT OFFICE 2,647,081

PHOTOCHEMICAL PREPARATION OF TROPILIDENES

William von E. Doering and Lawrence H. Knox, Katonah, N. Y., assignors to Research Corporation, New York, N. Y., a corporation of New York No Drawing. Application March 23, 1951, Serial No. 217,296

2 Claims. (Cl. 204—162)

This invention relates to the production of tropilidene and derivatives and substitution products thereof, and to the novel compounds thereby produced.

It has been found that mono- and bicyclic aromatic hydrocarbons and their substitution products, such as benzene, tetrahydronaphthalene and diphenyl, and alkyl, alkoxy, chloro, bromo and nitro substitution products thereof can be converted into the corresponding tropilidene compounds by the action of diazomethane under the influence of light.

The generally accepted structural formula of tropilidene ($C_7H_8$) is as cycloheptatriene:

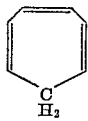

although its formulation as norcaradiene:

is not completely excluded.

The tropilidenes can be converted by oxidation to the corresponding tropolones which are of interest in the production of substances analogous in structure to colchicine and other naturally occurring substances.

The following examples are illustrative of the principles of the invention:

Example I

*Preparation of tropilidene.*—A mixture of 420 ml. of 45% potassium hydroxide and 4 l. of benzene is cooled to 5° C. in flask provided with a stirrer. Nitrosomethylurea, 206 g. (2 mole), is added in small portions with vigorous stirring as rapidly as the solid dissolves. After addition is completed, the deep yellow benzene layer is decanted and dried over potassium hydroxide pellets for two hours. The dried diazomethane-benzene solution is transferred to a round-bottom flask, clamped in an inclined position to permit cooling by a stream of running water, and irradiated. Two reflector type sunlamps may be conveniently employed as the light source. Evolution of nitrogen sets in immediately and continues for 20–24 hours or more, depending upon the age of the lamps. The benzene solution becomes colorless. The bulk of the benzene is removed by distillation through an efficient column and employed in a repetition of the above procedure. The residue is fractionated and the tropilidene is collected at 112–115° C. in an amount equivalent to 33–38% of theory based on nitrosomethylurea.

Example II

*Preparation of isopropyltropilidene.*—Isopropyltropilidene is prepared according to Example I substituting cumene (isopropylbenzene) for benzene. Isopropyltropilidene is collected at 171–175° C. and amounts to 30% of theory based on nitrosomethylurea.

Oxidation of the isopropyltropilidene with potassium permanganate in ethanol results in the production of the β- and γ-thujaplicin (β- and γ-isopropyltropolones).

Example III

*Preparation of methoxytropilidene.*—A mixture of 140 ml. of 45% potassium hydroxide and 1500 ml. of anisole is cooled to 5° C. in a flask provided with a stirrer. Nitrosomethylurea, 70 g. (0.67 mole), is added in small portions with vigorous stirring as rapidly as the solid dissolves. After addition is completed, the deep yellow anisole layer is decanted and dried over potassium hydroxide pellets for two hours. The dried anisole-methane solution is irradiated as described in Example I. The bulk of the anisole is removed by distillation in vacuo (B. P. 55–57° at 15 mm.) and employed in a repetition of the above procedure. The residue is distilled through a four-foot glass helix-packed column. The methoxytropilidene is collected at 89–91° C. at 50 mm. and amounts to 30.2% of theory based on nitrosomethylurea; $n^{25°}$ 1.5250.

Other substituted tropilidenes and tropilidene derivatives may be made by subjecting substitution products of benzene such as the alkyl, alkoxy, chloro, bromo and nitro substitution products, or bicyclic hydrocarbons containing at least one aryl ring such as tetrahydronaphthalene and diphenyl and their substitution products, to the action of diazomethane under the influence of light by the general procedure of the illustrative examples.

We claim:

1. A process for the preparation of tropilidenes which comprises irradiating with actinic light a mixture of diazomethane and a substance of the group consisting of monocyclic and bicyclic hydrocarbons containing at least one aromatic ring and their alkyl, alkoxy, chloro bromo and nitro substitution products and recovering the corresponding tropilidene thereby produced.

2. A process for the production of tropilidene which comprises irradiating with actinic light a solution of diazo-methane in benzene and recovering the tropilidene thereby produced.

WILLIAM von E. DOERING.
LAWRENCE H. KNOX.

References Cited in the file of this patent

UNITED STATES PATENTS

| Number | Name | Date |
|---|---|---|
| 2,478,152 | Cass | Aug. 2, 1949 |
| 2,490,866 | Gerhart | Dec. 13, 1949 |
| 2,504,016 | Foster | Apr. 11, 1950 |
| 2,522,589 | Vaughan et al. | Sept. 19, 1950 |
| 2,528,320 | Roberts et al. | Oct. 31, 1950 |
| 2,543,817 | Weil | Mar. 6, 1951 |
| 2,563,074 | Schmerling | Aug. 7, 1951 |

OTHER REFERENCES

Faraday's Encyclopedia of Hydrocarbon Compounds, vol. 2 (1945), pp. 07006.00.11.

Egloff, Physical Constants of Hydrocarbons, vol. II (1940), p. 441.

Erdtman et al. Nature, vol. 161 (1948), p. 719.